UNITED STATES PATENT OFFICE.

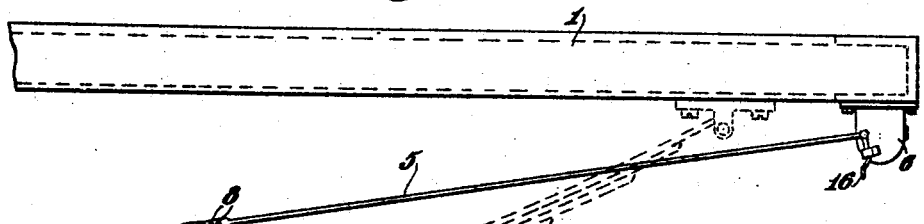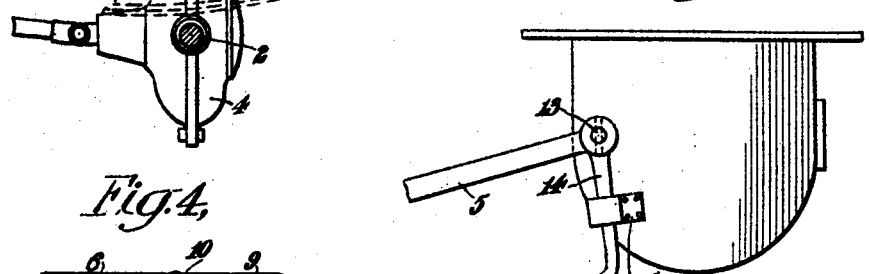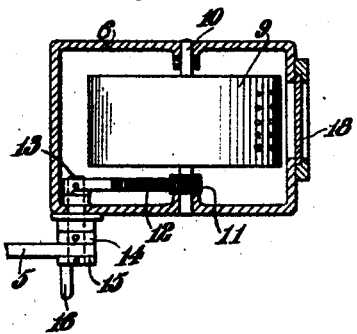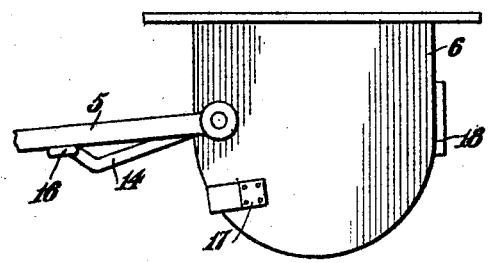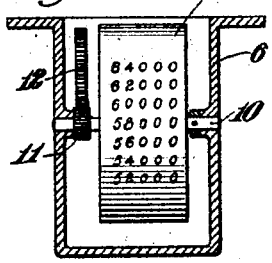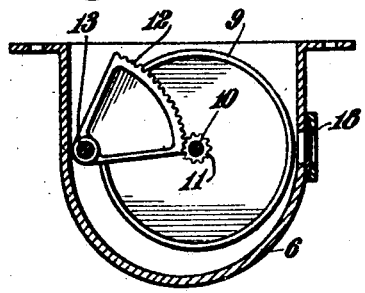

ROBERT S. GANS, OF NEW YORK, N. Y.

LOAD-INDICATING DEVICE.

1,409,699.  Specification of Letters Patent.  Patented Mar. 14, 1922.

Application filed April 9, 1920. Serial No. 372,392.

*To all whom it may concern:*

Be it known that I, ROBERT S. GANS, a citizen of the United States, residing in the city, county, and State of New York, have invented certain new and useful Improvements in Load-Indicating Devices, of which the following is a specification.

In my application Serial Number 317,422 filed August 14, 1919, entitled Loading indicator for vehicles, I have described an apparatus for indicating the degree of loading of trucks or other vehicles whereby the driver or truckman may easily be able to ascertain when the proper load has been placed upon his vehicle, so that he may avoid either under-loading or over-loading the same. In the said application a construction is described in which a swinging rod is connected at one end to the axle or part connected therewith and at the other end to an indicator which is secured to the frame or chassis of the vehicle. As the spring-supported vehicle frame moves downwardly or upwardly, as load is added to or taken from the same, the rod referred to assumes different angular positions and such movement of the swinging rod is at all times caused to rotate with the indicator. In the form of device particularly described in said application the outer end of the swinging rod has an angular extension which carries a gear within the indicator casing, this gear constantly meshing with a pinion on the indicator shaft. With this arrangement the indicator will constantly indicate the load of the vehicle, (or the flattening of the spring), in terms of the amount of the rotation of the swinging rod about its connection with the indicator, the angular position of the rod, and accordingly its rotation referred to, varying generally with the amount of load on the vehicle and the consequent flattening of the springs by which the vehicle frame is supported.

My present invention is an improvement upon the type of device referred to above, particularly in that my present invention does away with the necessity of causing the indicator to move at all times with the swinging rod or actuating member of the device. It is, of course, unnecessary for the purposes of an indicating device that the same should move except at the times when a reading is to be taken. Also with a geared indicator such as is described in my application referred to, the constant movement of the intermeshing gears, due to the constant rise and fall of the spring-supported vehicle frame or body when traveling, tends to wear the gears and make the device less accurate.

In my present invention I provide a member which is arranged to move relatively to the vehicle frame as the latter sinks or rises during its loading or unloading. This member may be, for example, a swinging rod connected at one end to the axle and at the other to the vehicle frame and adapted to assume various angular positions in a vertical plane as the vehicle frame rises and falls. I do not, however, connect this member directly to the indicator, but leave the latter normally in a position of rest and provide an actuating device therefor which may be moved by hand, whenever desired, through an arc or path which will vary in length with the position of the swinging rod or actuating device referred to, relative to the vehicle frame. Thus, in the case of an actuating member which takes the form of a swinging rod as described, the outer end of this rod may be mounted to rotate freely about a stud which extends from the indicator casing. A rotatable indicator drum is mounted within a casing and is connected by a pinion and sector with an arm which is normally held in a position of rest by a spring clip or the like. When it is desired to take an indicator reading, this arm is swung through a greater or less arc in a vertical plane until it is stopped by contact with the swinging rod. The indicator is so calibrated that the indicating figures exhibited when the swinging arm comes into contact with the angularly mounted rod, will indicate approximately the load of the vehicle at that moment.

In order that a clearer understanding of my invention may be had attention is hereby directed to the accompanying drawings forming part of this application and illustrating one embodiment of my invention. In the drawings Fig. 1 represents a partial side elevation of a motor truck with one form of my invention mounted thereon, Fig. 2 represents a side elevation of the indicator casing with connected parts on an enlarged scale, the actuating arm for the indicator being in its position of rest, Fig. 3 is a view similar to that shown in Fig. 2 with the actuating arm for the indicator in engagement with the swinging rod, Fig. 4 is a top plan view of the indicator and actuating parts, the indicator casing being shown in section, Fig. 5 is a side view of the indicator with one wall of the casing removed and Fig. 6 is a front elevation of the indicator with the casing shown in vertical section.

Referring to the drawings the frame or chassis 1 of a motor truck or other vehicle is supported in the usual way from the driving axle 2, by means of leaf springs one of which is indicated at 3. The housing of axle 2 is shown at 4. As the load upon the vehicle is increased these springs will yield and be flattened and the side parts of the vehicle frame will approach the housing 4.

As stated, a member is employed which may be connected to the axle housing and which will move relatively to the vehicle frame as the latter moves vertically relatively to the axle. It is essential that this member should extend into a position adjacent to the vehicle frame at all times so that the relative movement between this member and the vehicle frame may be measured whenever desired. In the preferred form of my invention, illustrated herein, the member referred to takes the form of the swinging rod 5 connected at one end to the axle housing, at the other end to the indicator casing 6 which is secured to the vehicle frame 1. The rod 5 may be connected by a link 7 to the axle housing 4, link 7 being pivotally connected at one end to the axle housing and at the other end to the rod 5, preferably by means of a pin which may be inserted in one or another of the series of openings 8 extending through the flattened end portion of rod 5.

The casing 6 contains the rotatable indicating drum 9 which is secured on a shaft 10 the opposite ends of which are rotatably mounted in the side walls of the casing. A pinion 11 on this shaft meshes with a geared sector 12 which is rotatably mounted on a shaft 13, to rotate therewith. Shaft 13 extends outwardly through a side wall of the casing. An arm 14 is secured to shaft 13 on the outside of the casing. The outer end of the swinging rod 5 is pivotally mounted on the outer end of shaft 13 so as to turn freely thereabout. Shaft 13 may be provided at its outer end with a collar 15 between which and the arm 14 the end portion of rod 5 may be received.

Arm 14 is provided with an offset portion 16, in the form of my invention illustrated herein, which is adapted to contact against the under side of rod 5 when the arm 14 is swung through a sufficient arc. The offset portion 16 may likewise be adapted to serve as a handle for rotating arm 14. The arm may normally be held in a position of rest, away from rod 5, by means of any suitable form of latching device or impositive lock such as the spring clip 17 indicated, which is secured to the side wall of casing 6 and is adapted to engage the arm 14 when the latter is swung outwardly into engagement therewith as is indicated in Fig. 2.

The indicating drum 9 is provided with indicating figures as shown which are adapted to be visible through the window 18 at the front of casing 6. These indicating figures are arranged to indicate the load on the vehicle frame, approximately, in pounds or other desired units. So long as arm 14 is held in its latching device 17 the indicator 9 together with its operating gears will be at rest, and an indication such as the words "not indicating" or the like on the drum 9 may be caused to appear at the window 18 if desired. During the loading or unloading, or travel, of the truck, the rod 5 will assume different angular positions or different positions in relation to the vehicle frame 1, without affecting the indicator. When, however, it is desired to take a reading, the arm 14 is swung inwardly until the same comes into contact or alignment with the rod 5 or, generally speaking, until the arm 14 has moved through a distance which is in accordance with the position of rod 5 in relation to the vehicle frame. The arm 14 will move, each time it is operated, through a fixed distance to reach the zero reading and then through a further distance which corresponds to the loading of the truck and the consequent flattening of springs 3, until it reaches the position occupied at the moment by rod 5, which further distance will measure approximately the loading of the truck and give the desired reading at the window 18.

It should be understood that my invention is not limited strictly to the details of construction described but is as broad as is indicated by the accompanying claims.

What I claim is:

1. In a device of the character described, the combination with an element of a vehicle and a spring-supported vehicle frame movable relatively to said element in accordance with the weight of the load, of a member supported at one point by the frame and at another point adapted to connect with the said vehicle element, and arranged to extend at angles which vary in accordance with the load, an indicator, and means for moving said indicator, said means comprising a member movable manually at will distances which vary in accordance with the angular position of said first member.

2. In a device of the character described, the combination with an axle and a spring-supported vehicle frame movable vertically relatively to said axle in accordance with the weight of the load, of a swing rod connected at its opposite ends to said axle and frame, and adapted to assume different angular positions as said frame moves vertically relatively to the axle, an indicator attached to the frame and adapted to measure angular movements, and means comprising an arm rotatable at will in a plane parallel to that in which said rod moves, for moving said indicator from a position of rest to a position in which further movement is prevented by said rod.

3. In a device for indicating the load of a spring-supported vehicle frame, the combination with the vehicle frame and axle, of an indicator casing secured to the frame, a revoluble indicator therein, a shaft extending outwardly from said casing, operatively connected to said indicator, a swinging rod pivotally connected at one end to the housing of the axle and at the other end pivotally mounted on said shaft to turn loosely thereabout, and an arm secured to said shaft and revoluble therewith in a plane parallel to that in which said rod moves, from a position of rest until it contacts against said rod.

4. In a device for indicating the load of a spring-supported vehicle frame, the combination with the vehicle frame and axle, of an indicator casing secured to the frame, a revoluble indicator therein, a shaft extending outwardly from said casing, gear connections between said shaft and indicator, a swinging rod pivotally connected at one end to the housing of the axle and at the other end pivotally mounted on said shaft on the outer side of said casing, to turn loosely thereabout, an arm secured to said shaft, adjacent to said rod, and having an offset adapted to contact against said rod when said arm is rotated, and means for normally latching said arm in a position of rest away from said rod.

This specification signed and witnessed this 8th day of April, 1920.

ROBERT S. GANS.

Witnesses:
DYER SMITH,
I. McINTOSH.